US011734801B2

(12) United States Patent
Ortiz Egea

(10) Patent No.: US 11,734,801 B2
(45) Date of Patent: Aug. 22, 2023

(54) DISTRIBUTED DEPTH DATA PROCESSING

(71) Applicant: Microsoft Technology Licensing, LLC, Redmond, WA (US)

(72) Inventor: Sergio Ortiz Egea, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 92 days.

(21) Appl. No.: 17/334,241

(22) Filed: May 28, 2021

(65) Prior Publication Data

US 2022/0383455 A1 Dec. 1, 2022

(51) Int. Cl.
| | | |
|---|---|---|
| *G06T 5/00* | (2006.01) | |
| *G06T 7/80* | (2017.01) | |
| *G06T 7/10* | (2017.01) | |
| *G06T 7/50* | (2017.01) | |

(52) U.S. Cl.
CPC .............. *G06T 5/002* (2013.01); *G06T 5/009* (2013.01); *G06T 7/10* (2017.01); *G06T 7/50* (2017.01); *G06T 7/80* (2017.01)

(58) Field of Classification Search
CPC .. G06T 5/002; G06T 7/10; G06T 7/50; G06T 5/009
See application file for complete search history.

(56) References Cited

U.S. PATENT DOCUMENTS

| | | | | |
|---|---|---|---|---|
| 8,355,565 B1* | 1/2013 | Yang | ........................ | G06T 7/593 |
| | | | | 382/154 |
| 2019/0239729 A1* | 8/2019 | Lim | ........................ | A61B 1/06 |
| 2020/0393245 A1* | 12/2020 | Ortiz Egea | ............. | G06T 7/194 |
| 2021/0088636 A1 | 3/2021 | Xu et al. | | |
| 2021/0264626 A1* | 8/2021 | Liu | ........................ | G01J 1/4204 |
| 2021/0287342 A1* | 9/2021 | Yang | .......................... | G06T 5/50 |
| 2022/0028157 A1* | 1/2022 | Cabral | .................... | H04N 7/157 |

FOREIGN PATENT DOCUMENTS

EP 3110149 B1 * 2/2019 ........... H04N 13/111

OTHER PUBLICATIONS

An Yatong et al., "Pixel-wise absolute phase unwrapping using geometric constraints of structured light system", Optics Express, vol. 24, No. 16, Aug. 3, 2016 (Aug. 3, 2016), p. 18445, 18449, (Yatong et al). (Year: 2016).*

(Continued)

*Primary Examiner* — Myron Wyche
(74) *Attorney, Agent, or Firm* — Alleman Hall Creasman & Tuttle LLP

(57) ABSTRACT

Examples are provided that relate to processing depth camera data over a distributed computing system, where phase unwrapping is performed prior to denoising. One example provides a time-of-flight camera comprising a time-of-flight depth image sensor, a logic machine, a communication subsystem, and a storage machine holding instructions executable by the logic machine to process time-of-flight image data acquired by the time-of-flight depth image sensor by, prior to denoising, performing phase unwrapping pixel-wise on the time-of-flight image data to obtain coarse depth image data comprising depth values; and send the coarse depth image data and active brightness image data to a remote computing system via the communication subsystem for denoising.

20 Claims, 10 Drawing Sheets

(56) References Cited

OTHER PUBLICATIONS

An, et al., "Pixel-Wise Absolute Phase Unwrapping using Geometric Constraints of Structured Light System", In Journal of Optics Express, vol. 24, Issue 16, Aug. 8, 2016, pp. 18445-18459.
"International Search Report and Written Opinion Issued in PCT Application No. PCT/US22/027548", dated Jul. 27, 2022, 12 Pages.

* cited by examiner

DISTRIBUTED DEPTH DATA PROCESSING

BACKGROUND

Depth sensing systems, such as time-of-flight (ToF) cameras, may be used to produce a depth image of an environment, with each pixel of the depth image representing a distance to a corresponding point in the environment. In ToF imaging, a distance to a point on an imaged surface in the environment is determined based on a length of a time interval in which light emitted by the ToF camera travels out to that point and then returns back to a sensor of the ToF camera. The raw data collected at the depth sensor is processed to produce a depth image.

SUMMARY

Examples are provided that relate to processing depth image data over a distributed computing system, where phase unwrapping is performed prior to denoising. One example provides a time-of-flight camera comprising a time-of-flight depth image sensor, a logic machine, a communication subsystem, and a storage machine holding instructions executable by the logic machine to process time-of-flight image data acquired by the time-of-flight depth image sensor. The instructions are executable to, prior to denoising perform phase unwrapping pixel-wise on the time-of-flight image data to obtain coarse depth image data comprising depth values. The instructions are further executable to send the coarse depth image data and the active brightness image data to a remote computing system via the communication subsystem for denoising.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1A:
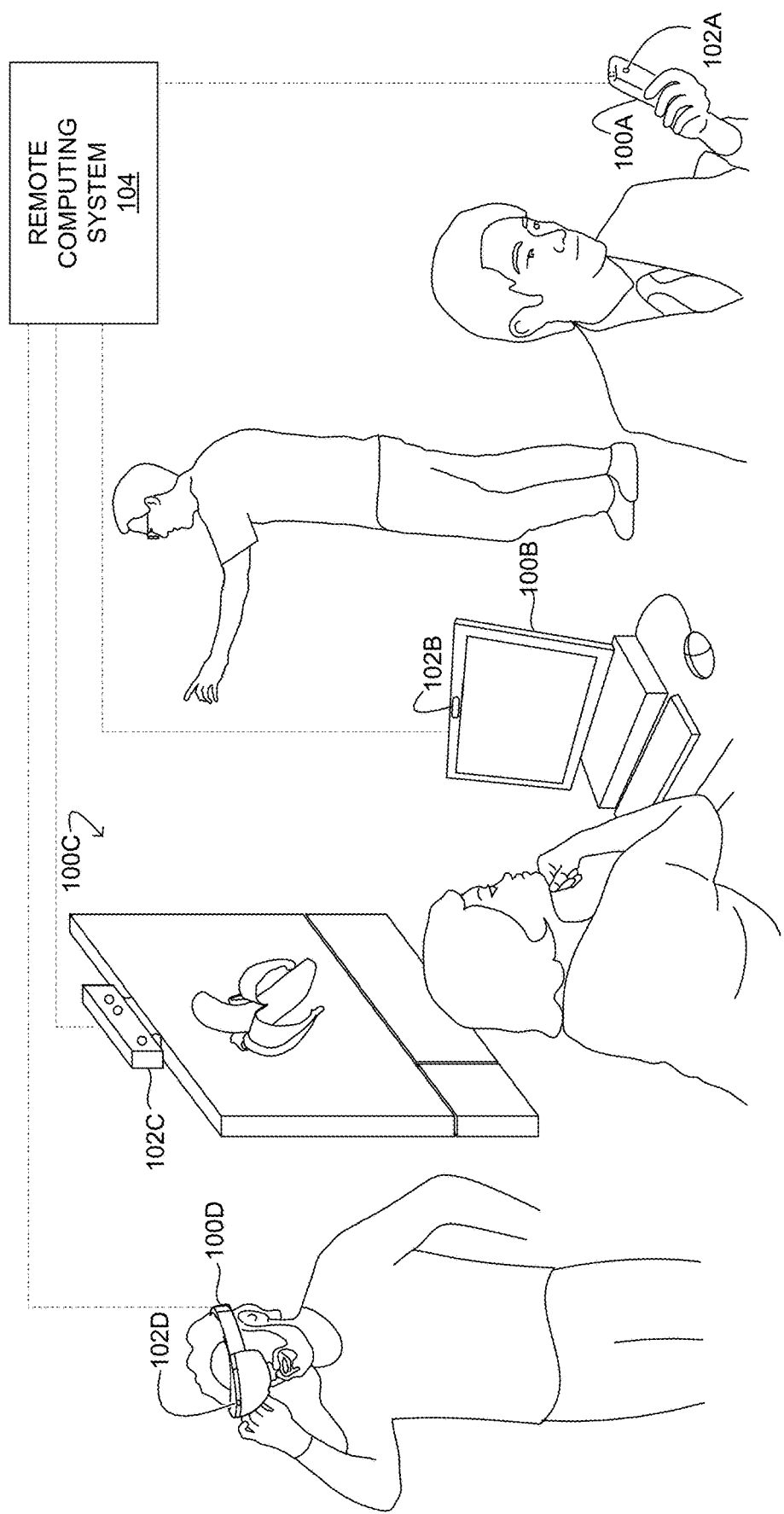
FIGS. 1A-1B show example electronic devices comprising time-of-flight (ToF) cameras.

As mentioned above, time-of-flight (ToF) depth cameras measure, for each sensor pixel of a depth image sensor, a length of a time interval for light emitted by the depth camera to return back to the sensor pixel. As reflectivity may vary across objects in a scene, some pixels may sense signals with low signal to noise ratios in some instances. Further, depth image sensor pixels may be sensitive to crosstalk errors, where photoelectrons captured at one pixel diffuse toward and are collected at neighboring pixels.

In view of such noise issues, denoising is commonly performed by a ToF depth camera on raw depth image data prior to performing other data processing, such as phase unwrapping that is used in phase-based ToF imaging. Phase-based ToF imaging is a variant of ToF imaging in which depth is computed based on the phase shift of amplitude modulated light reflected back from a subject. In phase-based ToF imaging, a light source on the ToF camera illuminates a scene with amplitude modulated light. The phase shift in the light reflected back from the subject is proportional to the subject's distance modulo the wavelength of the modulation frequency. However, due to the periodic nature of the modulated light, the measured total phase repeats (or wraps) every $2\pi$. Since the number of wrappings cannot be directly measured via a phase based ToF pixel, the total phase, and thus the actual distance related to the measurement, is ambiguous. To address this issue, two or more different modulation frequencies can be used to increase the range of unambiguity, allowing the phase information to be "unwrapped" for the accurate determination of distance. Phase unwrapping is a way to disambiguate the phase shift data by illuminating the scene with amplitude-modulated light of a plurality of different frequencies, as the distance ambiguities are different for each frequency of illumination light.

Accurate phase unwrapping may be difficult due to noise in the collected phase information. Noise, particularly near a $2\pi$ wrapping boundary, can lead to incorrect unwrapping, and thus relatively large errors in a determined distance at a pixel. As such, depth engine pipelines (processing pipelines used to process depth image data) commonly include procedures to denoise the data prior to performing phase unwrapping. For example, a depth sensor may perform multi-frequency phase collection to obtain noisy data for a plurality of modulation frequencies. Then, the noisy data is processed via signal calibration correction and denoising. Denoising processes generally utilize convolutions that apply a m×n kernel of pixels around a pixel being denoised, and thus are computationally expensive compared to pixel-wise operations. After denoising, the total phase can be calculated from the complex signal, followed by phase unwrapping and crosstalk correction. Additionally, in some examples, an intensity image may be obtained from the denoised data via active brightness averaging. The final depth and, in some examples, intensity images are then output, e.g., for use in gesture identification, AR applications, and/or other uses.

Depth engine pipelines are commonly implemented locally on ToF cameras. However, it may be difficult to support compute-intensive depth imaging on some low-power computing devices, such as those depicted in FIGS. 1A-1B (described below). One possible solution is to send raw sensor data to a remote device having greater compute resources and/or more available power. As mentioned above, denoising may be a compute intensive procedure that may utilize relatively large convolution kernels (e.g., N×N Gaussian filters where N≥5 in some examples). Larger denoising kernels may provide better precision at high computational cost, while smaller denoising kernels that have lower computational cost may result in lower precision. Thus, sending depth image data to a remote device for denoising may allow the use of a larger denoising kernel. However, the depth image data used to generate a single depth image can be large. For example, an example depth sensor may collect N*K images per frame, where K is the number of modulation frequencies (e.g. 2 or 3 in some examples) and N is a number of samples acquired at different phase angles (e.g. 2 or 3 in some examples) for each modulation frequency. Transmitting such a large amount of depth data to a remote computing system for denoising prior to phase unwrapping may be difficult at a reasonable camera frame rate (e.g. 30-60 Hz in some examples), as high bandwidth communication may have high power costs while low bandwidth communication may be insufficient for the quantity of data.

Accordingly, examples are disclosed relating to a distributed depth engine pipeline for processing depth images in which pixel-wise operations, including phase unwrapping, are performed prior to denoising, and coarse images are transmitted to a remote machine for denoising using more compute-intensive convolutional spatial and/or temporal filtering processes. Processing depth sensor data over a distributed computing architecture according to the present disclosure may provide various advantages. For example, all operations performed at the ToF camera may be pixel-wise, which may reduce power consumption and thus provide a ToF camera better fit for lower-power devices, such as mobile devices. Further, as the phase data is unwrapped prior to transmitting, less data is compressed/transmitted compared to transmitting raw depth image data (e.g. a single coarse depth image per frame, or a coarse depth image and coarse intensity image per frame), offering additional power savings and allowing for lower bandwidth connections. Additionally, performing denoising on a more powerful remote system may allow for use of larger denoising kernels and thereby provide improved depth precision. The examples disclosed also provide the ability to segment coarse depth data. As such, the distributed depth processing pipeline further may perform heavy compute on low-signal data while using fewer computing resources on high-signal data, which may provide increased speed and efficiency. Likewise, the distributed depth processing system may selectively transmit either high-signal data or ignore low-signal data for remote processing in various examples.

Figure 1B:
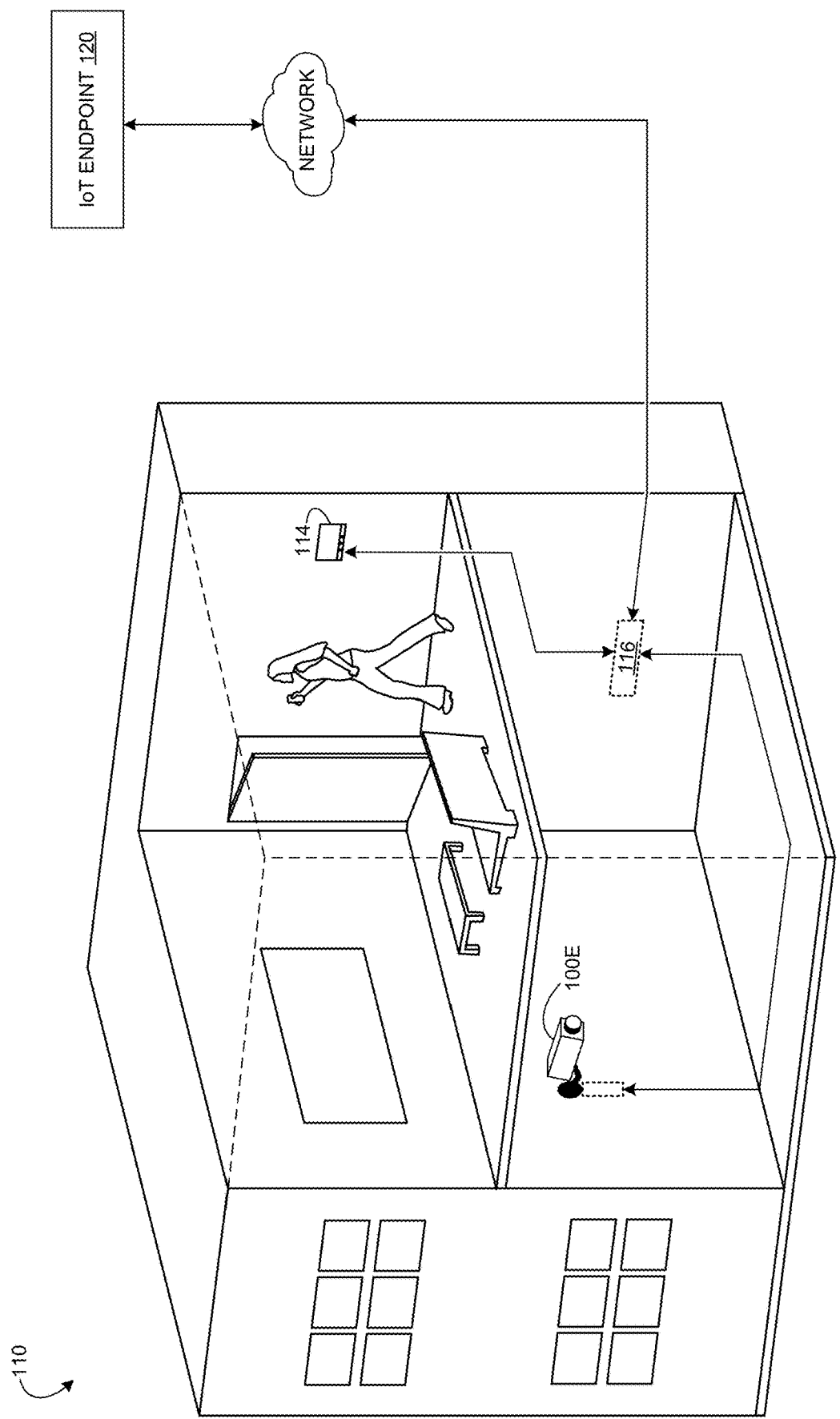

Prior to discussing these examples in detail, FIGS. 1A-1B illustrate various different example electronic devices 100A-E that may employ phase-based ToF depth ToF cameras. Referring first to FIG. 1A, device 100A is a smartphone that includes a ToF camera 102A. Device 100B is a personal computer that includes a ToF web camera 102B. Device 100C is a video game system that includes a peripheral camera system comprising a ToF camera 102C. Device 100D is a virtual-reality headset that includes a camera system comprising a ToF camera 102D. Each device may communicate with a remote computing system 104 to implement a distributed depth pipeline according to the disclosed examples. In combination with remote computing system 104, electronic devices 100A-D may process depth image data utilizing a distributed depth engine pipeline. Remote computing system 104 may comprise any suitable computing system, such as a cloud computing system, a PC, a laptop, a phone, a tablet, etc.

FIG. 1B shows an example use environment 110 including a security camera 100E comprising a ToF camera. Security camera 100E sends data to an IoT ("Internet of Things") endpoint computing device 120 via a communication hub 116 that also connects to other IoT devices, such as a thermostat 114. In combination with communication hub 116 and/or IoT endpoint computing device 120, security camera 100E may process depth image data utilizing a distributed depth engine pipeline. IoT endpoint computing device 120 may comprise any suitable computing system, e.g., cloud computing system, enterprise system, networked PC, or a virtual machine implemented on a cloud computing system.

Figure 2:
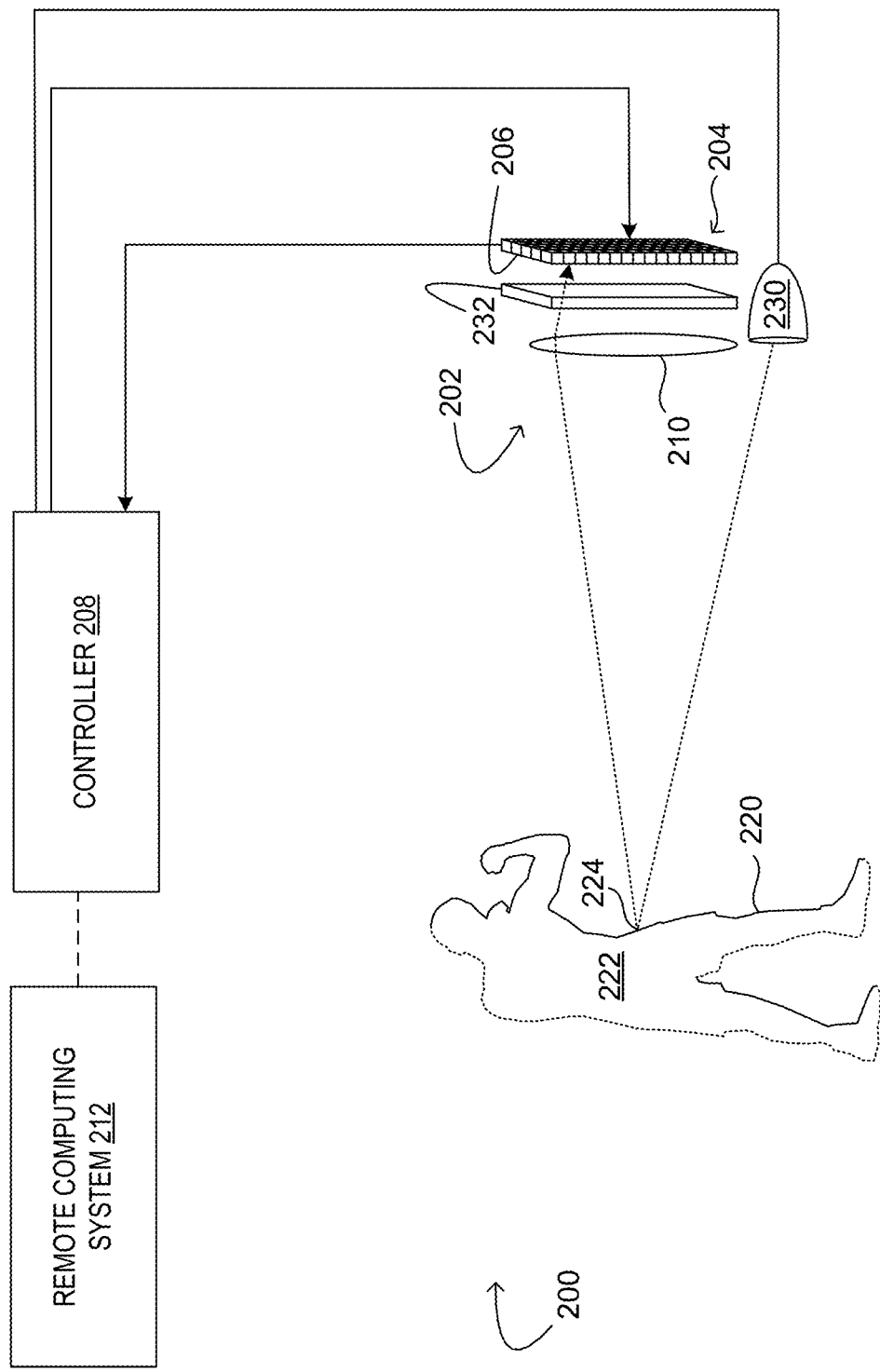
FIG. 2 shows aspects of an example ToF camera system.

FIG. 2 shows a schematic depiction of an example phase-based ToF depth imaging system 200 including a ToF camera 202. ToF camera 202 includes a sensor array 204 comprising a plurality of ToF pixels 206 each configured to acquire light samples that capture phase data, a controller 208, and an objective lens system 210. In some examples, objective lens system 210 may be omitted. Objective lens system 210 is configured to focus an image of at least one surface 220 of a subject 222 onto sensor array 204. Controller 208 is configured to gather and process data from ToF pixels 206 of sensor array 204 and thereby construct a depth image. Controller 208 may comprise executable instructions (e.g. software, firmware and/or hardware) to perform phase unwrapping, as described below. In some examples, controller 208 may be implemented across one or more computing devices. Controller 208 may communicate with a remote computing system 212 to perform depth image processing in accordance with the distributed depth image processing pipeline examples disclosed herein. Examples of hardware implementations of computing devices configured to perform phase unwrapping are described in more detail below with reference to FIG. 12.

Depth imaging system 200 also includes a modulated light emitter 230, and an analog and/or digitally modulated electronic shutter 232 for sensor array 204 to control the integration of light by the sensor array 204. Modulated light emitter 230 and sensor array 204 may be controlled via controller 208. Modulated light emitter 230 may be configured to emit electromagnetic radiation having any frequency detectable by ToF pixels 206. For example, modulated light emitter 230 may include an infrared (IR) light-emitting diode (LED), laser diode (LD), or any other suitable light source. The amplitude modulated light may be modulated at different frequencies sequentially or simultaneously, e.g., the modulation waveform may comprise a manifold of frequencies.

Sensor array 204 is configured to sample light from modulated light emitter 230 as reflected off surface 220 and back to the camera. Each ToF sensing pixel 206 of sensor array 204 may comprise one or more pixel taps operable to integrate the reflected light signal at different time intervals, from which the phase shift can be determined. Sensor array 204 is controlled, for each modulation frequency, to sample light at plural phase angles of the amplitude-modulated light from the light source, and determine a phase sample for each modulation frequency from the plurality of light samples for the modulation frequency. The phase samples can then be unwrapped to obtain a depth value for each pixel.

As mentioned above, due to the periodic nature of the modulated light, the measured total phase repeats (or wraps) every $2\pi$. For example, given a measured phase $\tilde{\phi}_k$, the total phase is $\tilde{\phi}_k + 2\pi n_k$, where $n_k$ is an integer. Since $n_k$ cannot be directly measured via a phase based ToF pixel, the total phase, and thus the actual distance related to the measurement, is ambiguous. Thus, in phase-based ToF imaging, there is a limitation on the distance that can be measured (referred to as the unambiguity range) imposed by the modulation frequency. Two or more different modulation frequencies can be used to increase the range of unambiguity, and the collected phase shift data is then unwrapped for the accurate determination of distance.

Figure 3:
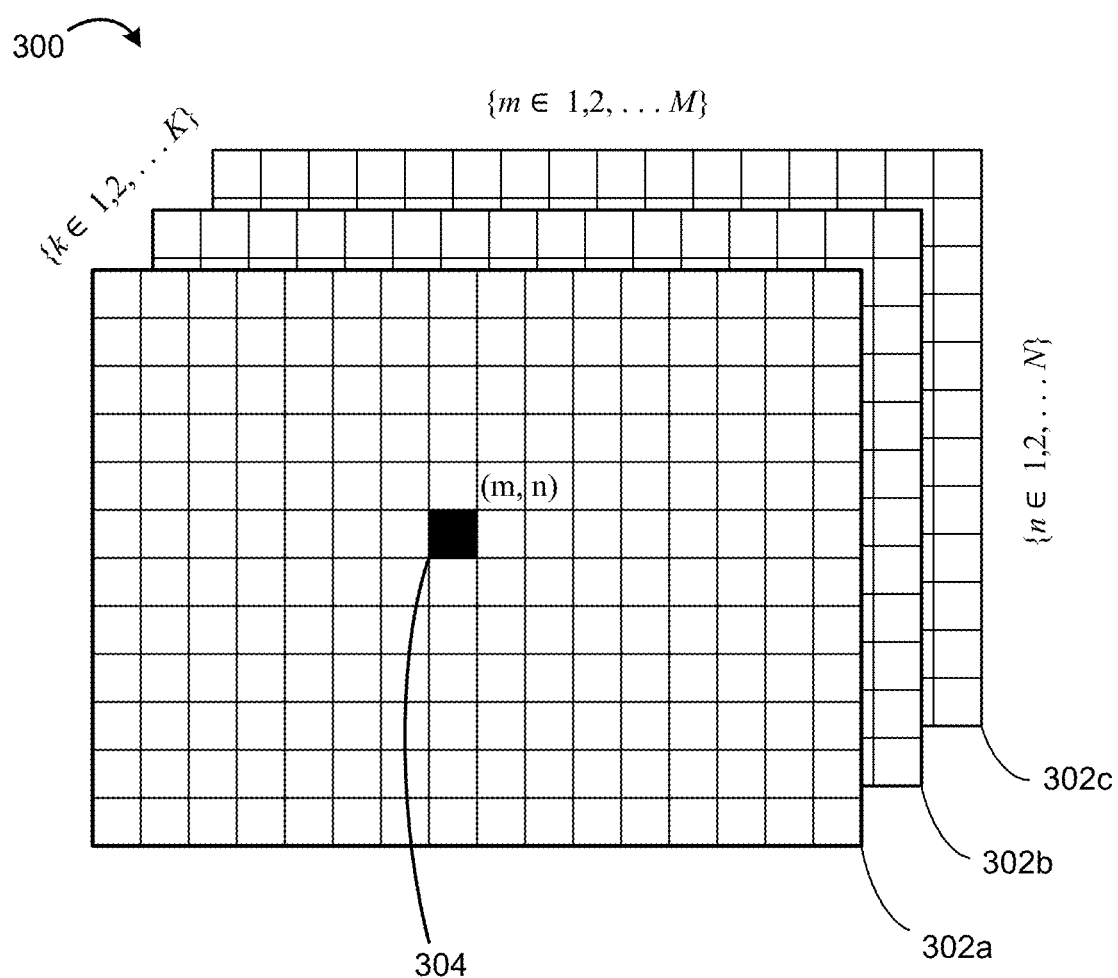
FIG. 3 schematically illustrates example ToF image data for a plurality K of modulation frequencies.

FIG. 3 schematically illustrates example ToF image data 300 for a plurality K of modulation frequencies. Data 300 represents data that can be acquired by depth imaging system 200 during multi-frequency frame collection. In the example shown, the depth data comprises a M×N array of data for each of K modulation frequencies, resulting in M×N grids 302a-c of data, wherein each pixel 304 in each grid represents a measurement acquired at a corresponding illumination light modulation frequency k of K modulation frequencies. For example, the experimental signal $\tilde{S}_k$ collected by pixel 304 at (m, n) is represented by $$\tilde{S}_k(m, n) = \tilde{A}_k(m, n) e^{i\tilde{\varphi}_k(m,n)}$$

where $\tilde{\varphi}_k$ is the phase, $\{m \in 1, 2 \ldots, M\}$, $\{n \in 1, 2 \ldots, N\}$, and $\{k \in 1, 2 \ldots, K\}$. A tilde accent over a variable indicates that the variable is obtained and/or calculated experimentally, while the absence of a tilde accent indicates variables that correspond to a noise-free situation. While the example depicted in FIG. 3 shows three grids 302a-c, any number of frequencies K≥2 can be used.

The phase of the complex signal $\tilde{\varphi}_k$ may be computed as $$\tilde{\varphi}_k = \arctan2(\tilde{S}_k^i, \tilde{S}_k^r)$$

where $\tilde{S}_k^i$ is the imaginary part of the signal collected for frequency k and $\tilde{S}_k^r$ is the real part of the signal collected. The measured phase is used to compute the depth value associated with the pixel. However, as mentioned above, in phase-based ToF imaging, there is a limitation on the distance that can be measured (referred to as the unambiguity range) imposed by the modulation frequency. Accordingly, a set of K≥2 modulation frequencies k can be used to increase the range of unambiguity, allowing the phase information to be unwrapped for the accurate determination of distance. Phase unwrapping is a way to disambiguate the phase shift data and identify a correct distance value by illuminating the scene with amplitude-modulated light of a plurality of different frequencies, as the distance ambiguities are different for each frequency of illumination light. For example, in a multifrequency method, the amplitude modulated light may comprise a waveform comprising a plurality of frequencies $\vec{f} = \{f_1, f_2, \ldots, f_K\}$. The collection of frequencies comprises frequencies that are chosen to wrap at different locations in the unambiguity range, which extends from distance zero to a point where all three frequencies wrap at a common distance.

As mentioned above, current depth image data processing methods perform denoising prior to phase unwrapping, which often involves the application of a convolutional spatial filter comprising a kernel of pixels surrounding a pixel being denoised. However, the application of the spatial filter for each pixel of depth data may be computationally intensive and consume significant computing resources. Thus, the disclosed examples utilize a distributed depth engine pipeline to move more compute-intensive operations to a remote device with more available power and/or compute resources, thereby preserving resources local to the depth imaging system. In this manner, a larger denoising kernel can be applied by the remote system to correct errors in a coarse depth image that is output by the depth imaging system.

Figure 4:
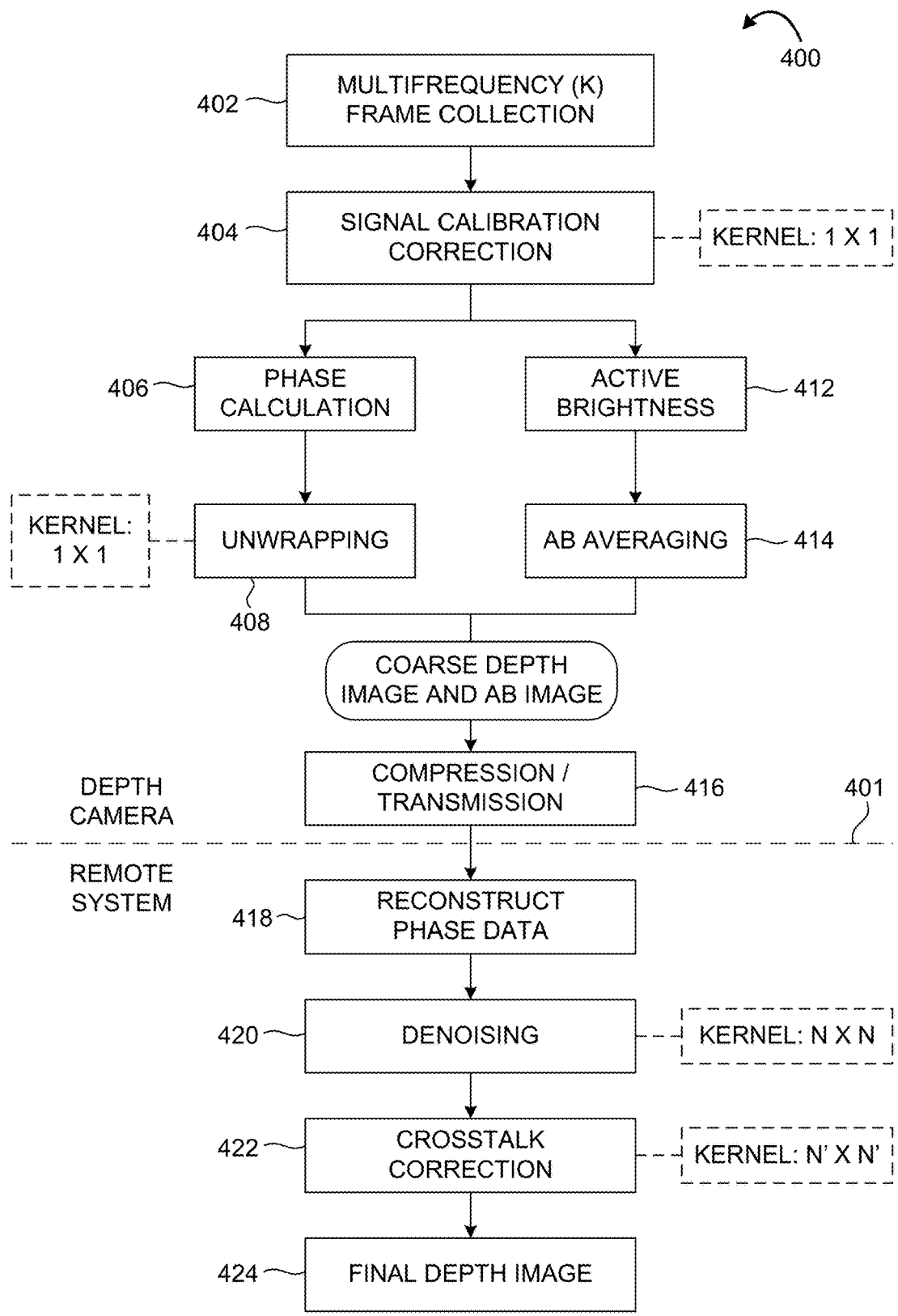
FIG. 4 shows an example pipeline for processing depth images that includes pixel-wise operations on a depth camera and convolutional operations at a computing device remote from the depth camera.

FIG. 4 schematically shows an example distributed pipeline 400 for processing time-of-flight image data to obtain a denoised depth image. In this example, the procedures above dashed line 401 are performed within the ToF camera and/or within the depth camera, while procedures below the line are performed by processing remote to the depth camera. At 402, the pipeline includes multi-frequency frame collection, where a plurality of phase samples (each comprising a frame of image data) is collected for each of a plurality of amplitude modulation frequencies. The phase data is collected by a depth image sensor of the ToF camera. At 404, pixel-wise signal calibration correction is performed. In the example depicted, a 1×1 kernel indicates pixel-wise operations local to the depth camera.

In current depth engine pipelines, denoising is performed prior to phase and active brightness calculation. However, in the disclosed examples, phase and active brightness calculations are performed without first performing denoising (and thus without using spatial or temporal filters.) In the depicted example, at 406, distributed pipeline 400 calculates phase information from the time-of-flight image data, and then performs phase unwrapping pixel-wise at 408. The phase unwrapping operations provide a phase number (i.e. a number of wrappings of each modulation frequency) for each pixel, which is then used to compute a depth value for each pixel. As a result of the phase unwrapping, a coarse depth image is produced. The coarse depth image may have more unwrapping errors than a depth image produced using denoised data, as noise can cause a phase measurement to appear in a different phase wrapping than wrapping corresponding to the actual distance. However, such phase errors may be corrected by remote denoising. The calibrated image data also may be used to produce an active brightness (AB) image, at 412. Then, at 414, pixel-wise AB averaging operations are performed to generate the active brightness image.

Continuing with FIG. 4, the coarse depth image and active brightness image are transmitted to a remote computing system at 416. In some examples, the coarse depth image and active brightness image can be compressed to conserve bandwidth. Further, in some examples, the coarse depth image can be segmented based upon a metric such as signal to noise ratio, and pixels above or below a threshold may be sent for remote processing to the exclusion of other pixels, as described in more detail below.

At 418, the remote computing system uses the depth values from coarse depth image to reconstruct noisy phase data. For example, M×N×k phase data can be reconstructed from a coarse M×N depth image by $$\tilde{S}(m, n, k) = \tilde{S}_r(m, n, k) + i\tilde{S}_i(m, n, k) = \widetilde{AB}(m, n) e^{i\tilde{\varphi}(m,n, k)}$$

where $\tilde{S}$ is the reconstructed signal, $\tilde{S}_r$ and $\tilde{S}_i$ are the real and imaginary parts of the signal, $\widetilde{AB}$ is the active brightness transmitted by the device, and $\tilde{\varphi}$ is the phase. Here, the tilde accent indicates a noisy signal or noisy value. The phase may be determined from the coarse depth by $$\tilde{\varphi}(m, n, k) = \frac{4\pi \tilde{d}(m, n) f_k}{c}$$

where d is the depth and $f_k$ is a frequency of K total frequencies.

In some examples, the frequencies used in reconstruction can be different from the frequencies used by the camera during frame collection. For example, a set of virtual frequencies can be introduced and used to reconstruct phase data using the above equations. Further, any suitable plurality K of frequencies may be used. Different frequencies and/or a different number of frequencies may be chosen to produce a more noise resilient solution by maximizing the area, volume, or hypervolume of the Voronoi cell determined by the frequencies.

At 420, the distributed pipeline performs signal correction on the coarse depth image and coarse intensity image. As described in more detain below, signal correction may comprise various denoising processes, such as jitter reduction, smoothing, and/or edge enhancement, some of which can include convolutional operations, as shown by the depicted N×N kernel. Further, the signal correction can include segmentation of the image to process different pixels differently in some examples. After signal correction, crosstalk correction is performed at 422 as shown by the depicted N'×N' kernel to generate a final denoised depth image and a final coarse intensity (active brightness) image at 424. The final images may be output, for example, to software applications on the remote computing system, to the device incorporating the ToF camera, or to a cloud computing system.

Using distributed pipeline 400, more compute-intensive processes can be performed remotely rather than on the depth imaging system. For example, remotely denoising at 420 may use large kernel sizes (N×N Gaussian filters, N≥5), thus improving efficiency of the distributed pipeline. In some examples, the denoising kernel may have a size of between 5×5 and 19×19 pixels. Remote processing of denoising may allow for larger kernel sizes to be employed, compared to other pipelines where denoising is performed on the ToF camera. The use of such larger denoising kernels remotely after phase unwrapping may allow the recovery of depth data that has a higher accuracy compared to the use of a smaller denoising kernel used on the depth camera prior to phase unwrapping.

In some examples, the kernel size may be tuned to provide a desired level of accuracy. As discussed in more detail below, a relatively larger or smaller kernel size may be used depending on a signal to noise ratio, and kernel sizes may be varied on a pixel-by-pixel basis. Further, in some examples, the remote system alternatively or additionally can perform temporal filtering, which may comprise compute-intensive convolutions over T stored coarse depth image frames (e.g., using N×N×T kernels). The use of a remote system to perform temporal filtering after phase unwrapping may provide advantages over performing temporal filtering on a depth camera prior to phase unwrapping. For example, temporal filtering involves storing a number T of prior image frames. As such, performing temporal filtering prior to phase unwrapping involves the storage of a greater number of individual image frames of depth image data for each depth image, due to having to store phase samples at each modulation frequency, than performing temporal filtering using coarse depth (and coarse intensity) data. Further, a remote computing system may have more available storage than a depth camera, allowing the remote computing system to store a greater number of prior depth images.

Figure 5:
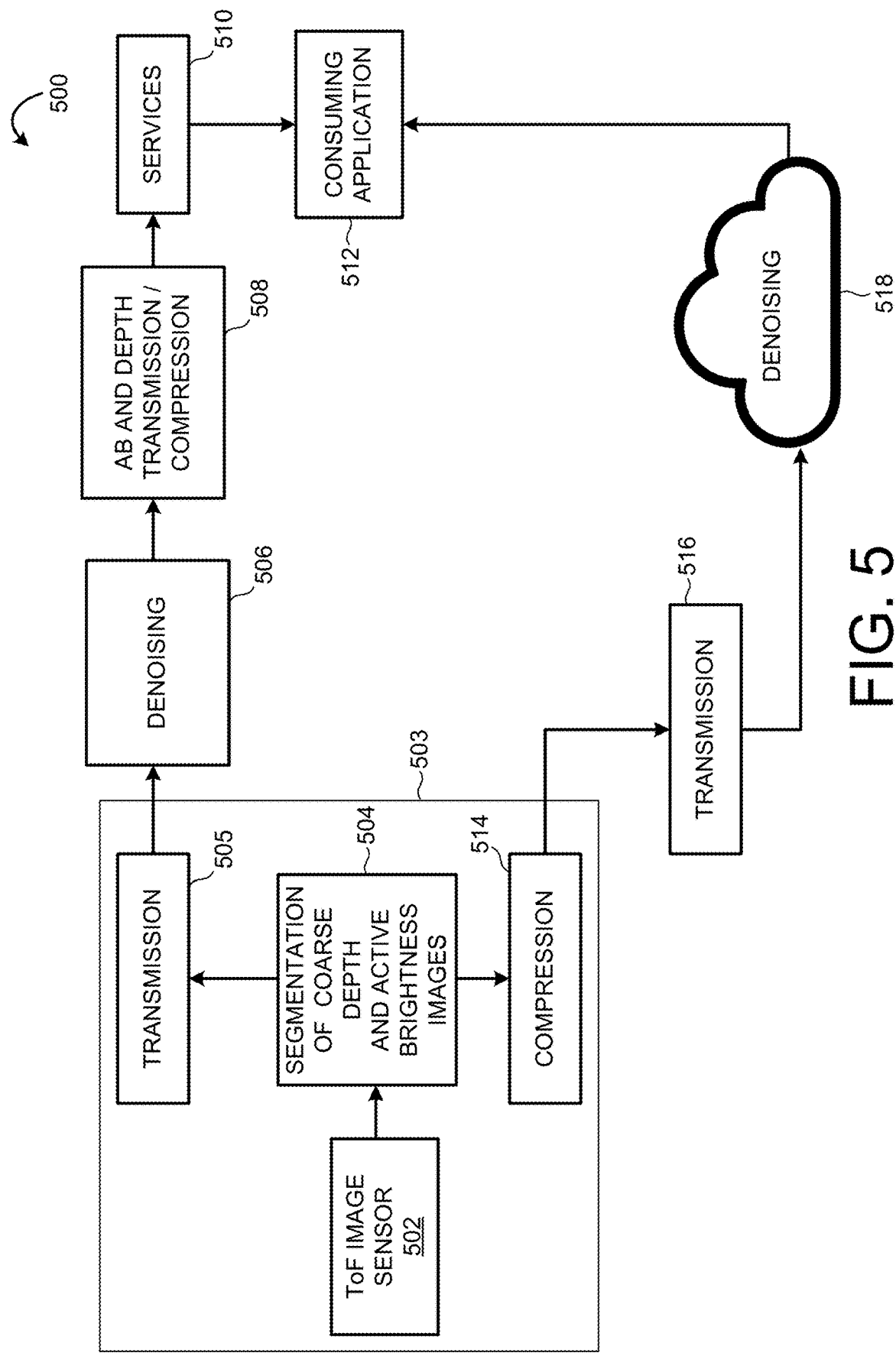
FIG. 5 schematically shows another example distributed depth engine pipeline for processing segmented depth data.

As mentioned above, in some examples, a coarse depth image (and potentially an active brightness image corresponding to the depth image) may be segmented such that some depth pixels (as well as some intensity pixels of an AB image) are processed locally on a device comprising a depth camera, while other pixels are processed remote from the device comprising the depth camera. FIG. 5 shows a block diagram of an example distributed depth engine pipeline 500 that illustrates examples of such processing pathways. ToF image sensor 502 of depth camera 503 generates a coarse depth image and an active brightness image at 504, as described above with regard to FIG. 4. The ToF camera 503 also segments the images to direct some pixels of depth data to cloud-based computing system 518 for more compute-intensive processing and other pixels to a local processor (e.g. local to a device with which the depth camera is integrated or for which the depth camera is a peripheral) for less compute-intensive processing (a processor of a phone, wearable device, etc.). In some instances, a coarse depth image may not be segmented, and thus processed fully locally or fully remotely, depending upon conditions applied when determining whether to segment. Example conditions are described below.

For a segmented image, a first subset of pixels is transmitted at 505 to a processor local to a device on which the depth camera 503 is located for local denoising 506 utilizing a smaller denoising kernel. The denoised pixels may optionally be compressed at 508, provided to services at 510, and/or provided to a consuming application 512. Example services include machine-learning processes and/or high level algorithms, such as face identification, object recognition, surface reconstruction, and simultaneous localization and mapping algorithms. Other pixels of depth data from the coarse depth image can be compressed at 514 and transmitted at 516 to a cloud-based computing system 518 for remote denoising using a larger denoising kernel. The cloud-based computing system denoises those pixels of the coarse depth image (and potentially pixels of an active brightness image) to produce denoised pixels, and then provides the denoised pixels to the consuming application 512.

Figure 6:
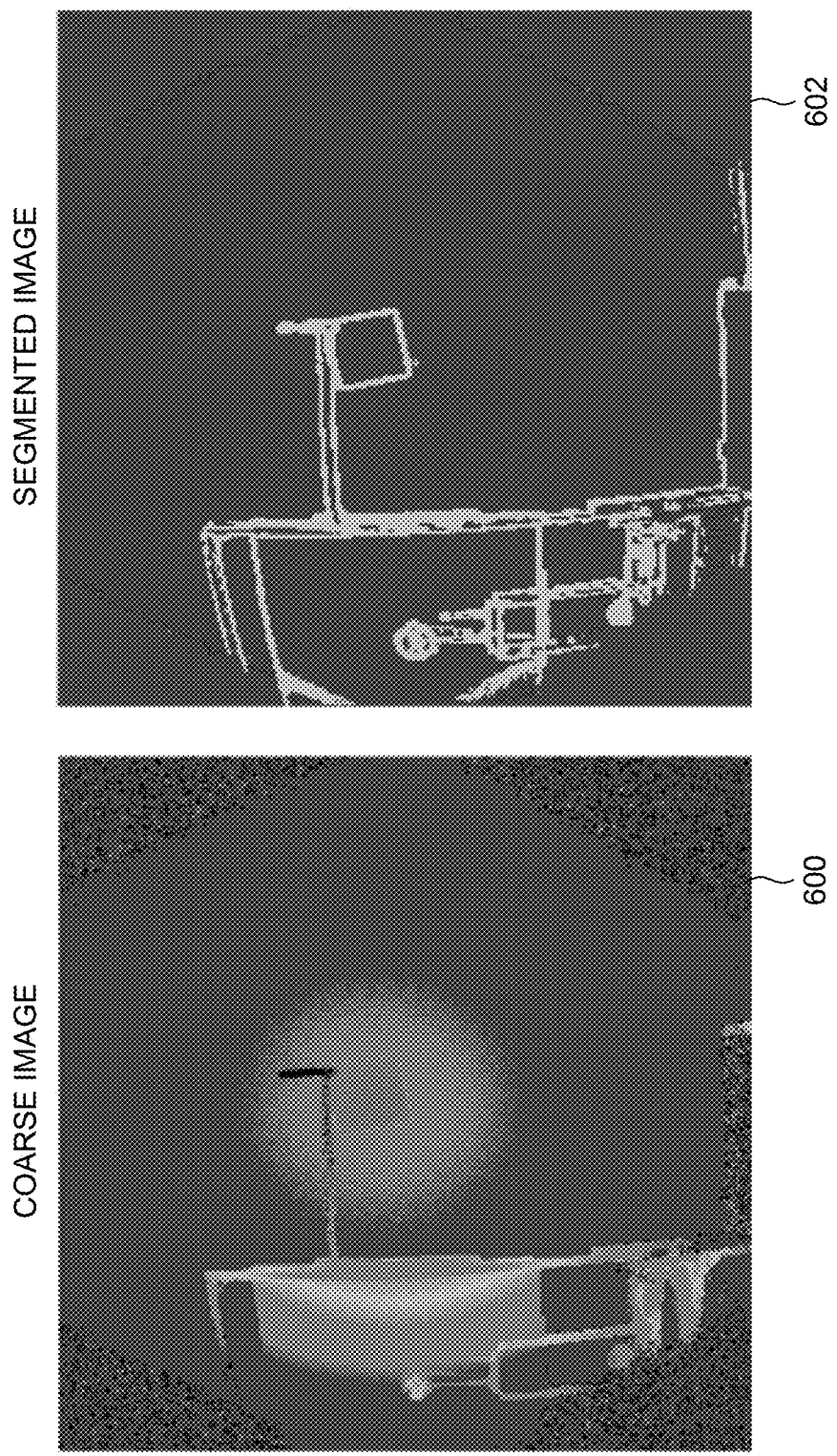
FIG. 6 shows an example segmentation of a coarse depth image.

FIG. 6 shows an example segmentation of a coarse depth image 600 to generate a segmented image 602. In some examples, the segmenting process may be based upon image regions comprising relatively higher signal to noise (i.e., high signal) and regions comprise relatively lower signal to noise (i.e., low signal), and which regions are edge regions. Any suitable image metrics may be used to segment a coarse depth image, including variance, standard deviation, average, and/or coefficient of dispersion for intensity and/or depth. The coefficient of variation is the standard deviation of the kernel over the average value of the population and is a non-dimensional quantity that provides the variability in relation to the mean of the population. When the data in the kernel is highly variable compared to the mean signal it can indicate an edge in the case of active brightness, or unwrapping errors in the case of depth. The coefficient of dispersion, defined as the variance of the population over the average, is a dimensional amount and therefore non scale invariant that provides an indication of cluster in the data, i.e. a value over 1 detects edges in the case of active brightness, or unwrapping errors in the case of depth.

As mentioned above, in some examples, larger denoising kernels are used on lower signal to noise regions, and smaller kernels are used on higher signal to noise regions. Further, in some examples, edge regions are treated with other filters, such as Gaussian blurring. In some examples, Gaussian blurring generates coefficients radially distributed and spatially dependent according to:

$$e^{-\lambda(\rho)(i^2+j^2)} \text{ with } \begin{cases} i = -I, -I+1, \ldots, I \\ j = -J, -J+1, \ldots, J \end{cases}$$

where λ is a parameter responsible for the smoothing. In some examples, the precision, or "jitter," may be controlled and stabilized by making the smoothing coefficient dependent on the ratio ρ:

$$\rho(\Delta) = \frac{\Delta_T^\zeta}{\Delta_O^\zeta} \text{ with } \zeta = \frac{1}{2}, 1$$

where ρ is the ratio between the noise target $\Delta_T^\zeta$ and the variability of the depth without filtering $\Delta_O^\zeta$ within the kernel. Here, ζ denotes either the standard deviation $$\left(\zeta = \frac{1}{2}\right)$$

or the variance (ζ=1).

Figure 7:
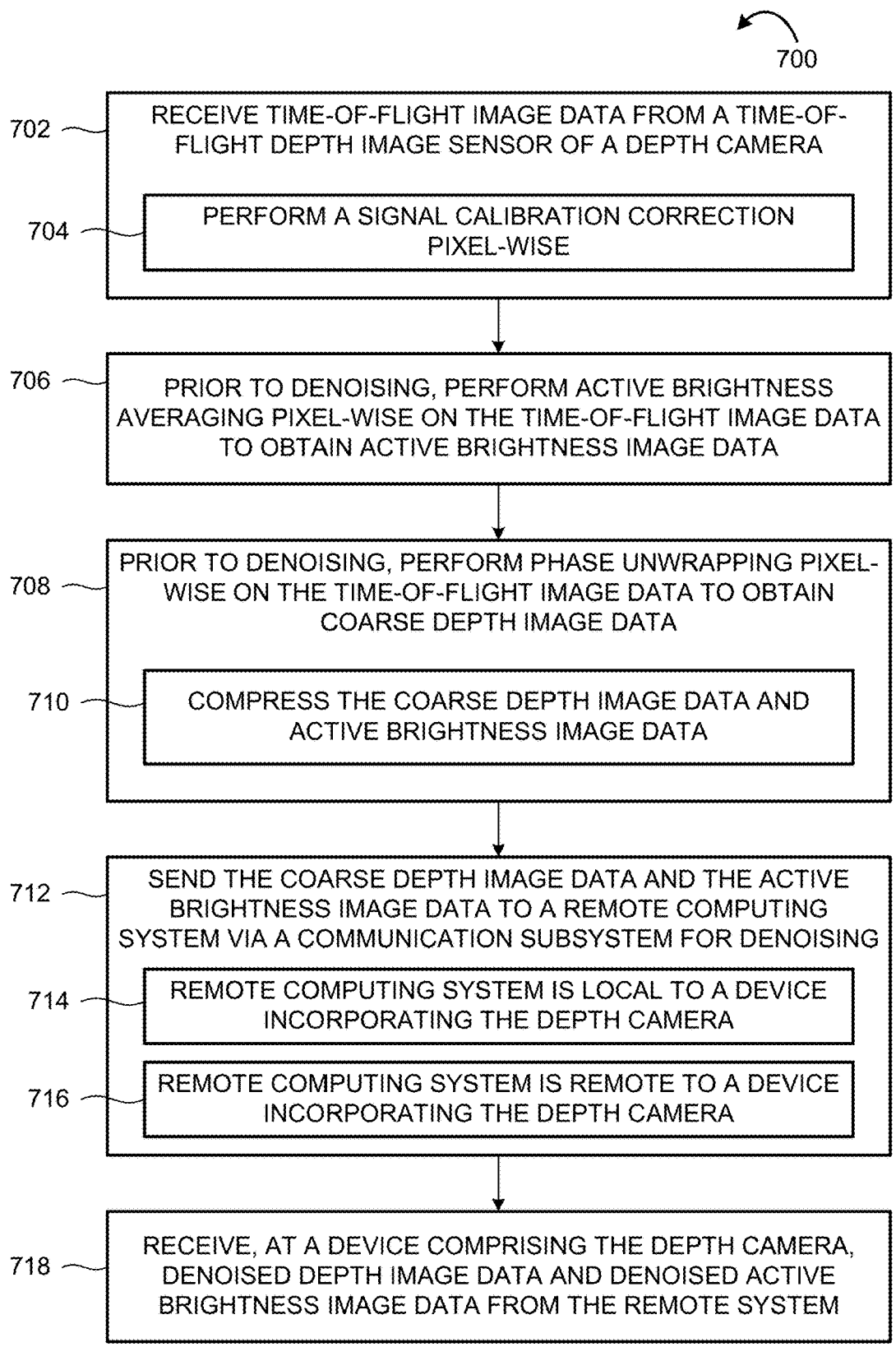
FIG. 7 shows a flow diagram of an example method for processing depth sensor data using pixel-wise operations on a depth camera to generate coarse depth image data and active brightness image data.

FIG. 7 shows a flow diagram of an example method 700 for processing depth data acquired from a ToF depth image sensor. Method 700 may be enacted on a ToF camera comprising the ToF depth image sensor, including those depicted in FIGS. 1A-1E above. At 702, method comprises receiving time-of-flight depth image data from a ToF depth image sensor. In some examples, at 704, the method comprises, prior to denoising, performing signal calibration correction pixel-wise on the time-of-flight image data. At 706 the method comprises, prior to denoising, performing active brightness averaging pixel-wise on the time-of-flight image data to obtain active brightness image data. At 708, the method comprises, prior to denoising, performing phase unwrapping pixel-wise on the time-of-flight image data to obtain coarse depth image data. In some examples, at 710, the method comprises, compressing the coarse depth image data and active brightness image data.

Method 700 further comprises, at 712, sending the coarse depth image data and the active brightness image data to a remote computing system via a communication subsystem for denoising. As mentioned above, in some examples, compressed images are sent to conserve bandwidth. In some examples, at 714, the remote computing system is local to a device incorporating the ToF camera. In other examples, at 716, the remote computing system is remote to a device incorporating the ToF camera. Further, as mentioned above, in some examples, coarse depth image data and active brightness image data can be segmented, and subsets of pixels of coarse depth image data can be sent to each of a local processor and a remote computing system based upon the segmenting.

In some examples, at 718, the method further comprises receiving, at a device incorporating the ToF camera, denoised depth image data and denoised active brightness image data from the remote system. Such a device may comprise any suitable computing device, such as a head-mounted display device, a phone, a laptop, an IoT sensor, an automobile, any of devices 100A-100E, or other device. Where a subset of coarse depth pixels were sent for remote processing, receiving the denoised depth image data and denoised active brightness image data may comprise receiving denoised image data corresponding to the coarse image data sent to the remote device.

Figure 8:
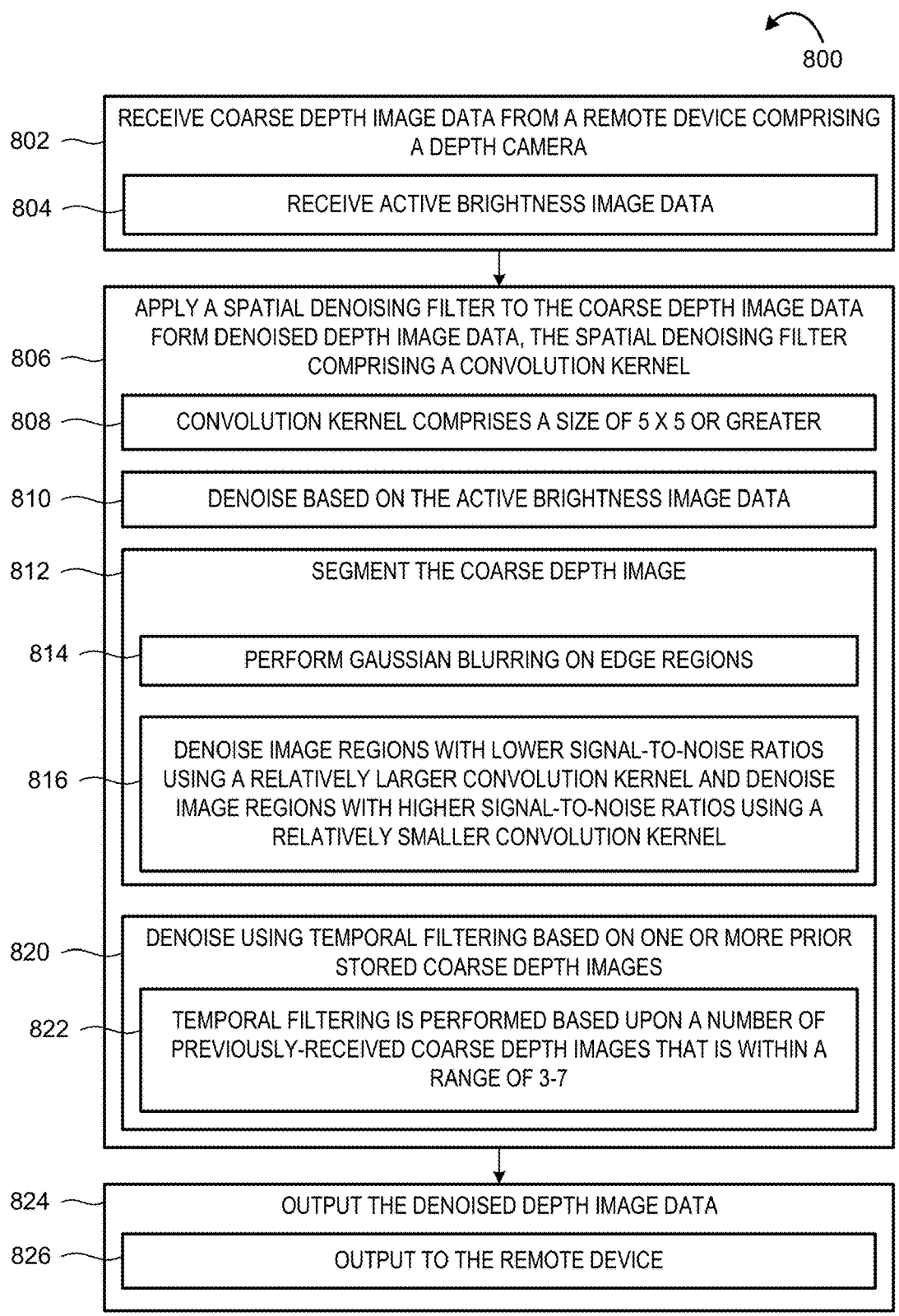
FIG. 8 shows a flow diagram of an example method for denoising coarse depth image data and active brightness image data.

FIG. 8 shows a flow diagram for an example method 800 enacted on a computing system for denoising a coarse depth image. Method 800 may be enacted on any suitable computing system, including a cloud computing system, enterprise system, networked PC, etc. At 802, the method comprises receiving coarse depth image data from a remote device comprising a ToF camera. Further, in some examples, at 804, the method comprises receiving active brightness image data. In some examples, active brightness image data comprises an average active brightness image. The coarse depth image data and active brightness image data may be received from a ToF camera or a device comprising a ToF camera that is remote to the computing system enacting method 800.

At 806, the method comprises applying a spatial denoising filter to the coarse depth image data to form a denoised depth image, the spatial denoising filter comprising a convolution kernel. In some examples, at 808, the convolution kernel comprises a size of 3×3 or greater. For example, the convolution kernel can have a size of between 3×3 and 19×19 in more specific examples.

In some examples, method 800 comprises, at 810, denoising the coarse depth image data based at least on the active brightness image data. For example, the AB image can be used with the coarse depth image to reconstruct phase data, and denoising can be performed based on the reconstructed phase data.

Further, in some examples, at 812, the method comprises segmenting the coarse depth image data into regions such as lower signal regions, higher signal regions, and/or edge regions. Also, in some such examples, at 814, the method comprises performing Gaussian blurring on edge regions. Additionally, in some examples, at 816, the method comprises denoising image regions with lower signal to noise ratios using a relatively larger convolution kernel, and denoising image regions with higher signal to noise ratios using a relatively smaller convolution kernel.

In some examples, coarse depth image data can be stored and used in denoising by temporal filtering. In such examples, at 820, the method comprises denoising the coarse depth image data using temporal filtering based on prior stored coarse depth image data. In some such examples, at 822, temporal filtering is performed based upon 3-7 previously received coarse depth images. In some such examples, when there is high relative movement between images, temporal filtering is performed based upon a greater number of images. In other examples, any other suitable number of images may be used for temporal filtering. More generally, any suitable temporal and/or spatio-temporal filters may be used in the denoising process.

Method 800 further comprises, at 824, outputting the denoised depth image data. In some examples, the method also outputs denoised active brightness image data. In some examples, at 826, the denoised depth image data and active brightness image data are output to the remote device comprising the ToF camera.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
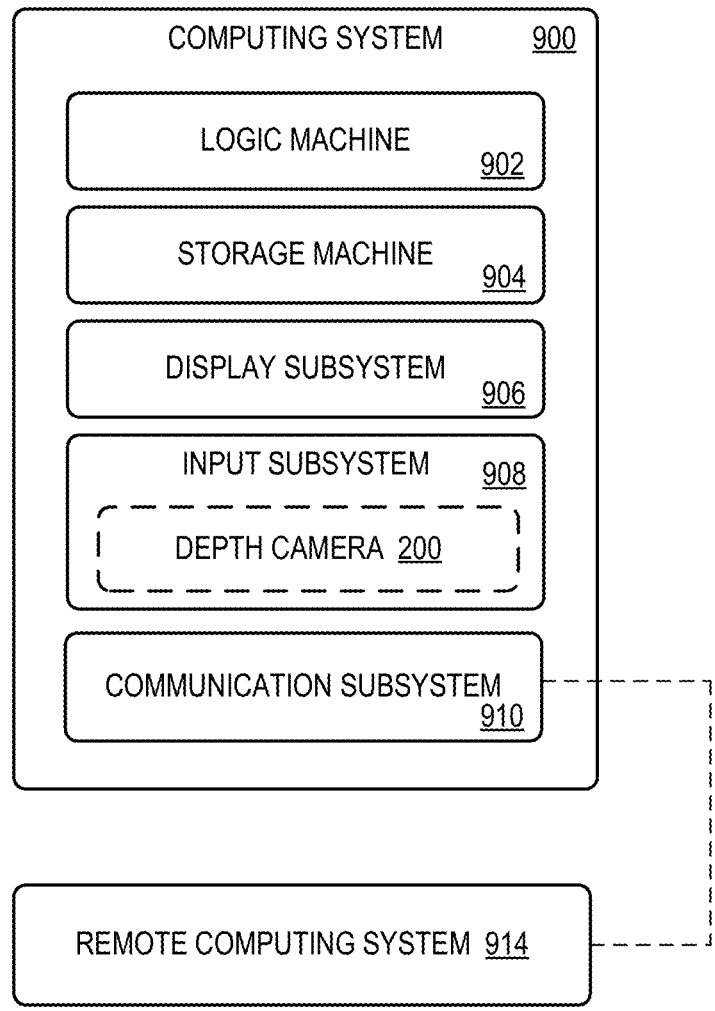
FIG. 9 shows a block diagram of an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 904 includes one or more physical devices configured to hold instructions executable by the logic machine to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 902 executing instructions held by storage machine 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage machine 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera (e.g., depth camera 200) for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices, such as remote computing system 914. Remote computing system 914 may comprise, e.g., a cloud computing system, an enterprise system, or a networked PC, as examples. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

Another example provides a time-of-flight camera, comprising a time-of-flight depth image sensor, a logic machine, a communication subsystem, and a storage machine holding instructions executable by the logic machine to process time-of-flight image data acquired by the time-of-flight depth image sensor by, prior to denoising, performing phase unwrapping pixel-wise on the image data to obtain coarse depth image data comprising depth values, and send the coarse depth image data and the active brightness image data to a remote computing system via the communication subsystem for denoising. In some such examples, the instructions are further executable to compress the coarse depth image and the active brightness image before sending the coarse depth image and the active brightness image to the remote computing system. Additionally or alternatively, in some examples the instructions are further executable to, prior to denoising, perform a pixel-wise signal calibration correction. Additionally or alternatively, in some examples the time-of-flight camera further comprises a device incorporating the time-of-flight camera, and the remote computing system is remote from the device incorporating the time-of-flight camera. Additionally or alternatively, in some examples the instructions are further executable to segment a coarse depth image including the coarse depth image data, and send the coarse depth image data to the remote computing system after segmenting. Additionally or alternatively, in some examples the instructions are further executable to process the time-of-flight image data by, prior to denoising, performing active brightness averaging pixel-wise on the time-of-flight image data to obtain active brightness image data.

Another example provides a computing system comprising a logic machine, a communication subsystem, and a storage machine holding instructions executable by the logic machine to receive coarse depth image data from a remote device comprising a time-of-flight camera, apply a spatial denoising filter comprising a convolution kernel to form denoised depth image data, and output the denoised depth image data. In some such examples, the instructions are further executable to receive active brightness image data from the remote device, and denoise the coarse depth image data based at least on the active brightness image data. Additionally or alternatively, in some examples the instructions are further executable to segment the coarse depth image data based upon a threshold signal to noise ratio. Additionally or alternatively, in some examples the instructions are executable to perform denoising on coarse depth image data with lower signal to noise ratios using a relatively larger convolution kernel, and perform denoising on coarse depth image data with higher signal to noise ratios using a relatively smaller convolution kernel. Additionally or alternatively, in some examples the convolution kernel comprises a size in a range of 3×3 and 19×19. Additionally or alternatively, in some examples the denoised depth image data is output to the remote device. Additionally or alternatively, in some examples the instructions are further executable to denoise the coarse depth image data using temporal filtering based on prior stored coarse depth image data. Additionally or alternatively, in some examples the temporal filtering is performed based upon 3-7 previously-received coarse depth images.

Another example provides a method enacted on a time-of-flight camera, the method comprising receiving time-of-flight image data from a time-of-flight depth image sensor of the time-of-flight camera, prior to denoising, performing active brightness averaging pixel-wise on the time-of-flight image data to obtain active brightness image data, prior to denoising, performing phase unwrapping pixel-wise on the time-of-flight image data to obtain coarse depth image data, and sending the coarse depth image data and the active brightness image data to a remote computing system via a communication subsystem for denoising. In some such examples, the method further comprises compressing the coarse depth image data and the active brightness image data before sending the coarse depth image data and the active brightness image data to the remote system. Additionally or alternatively, in some examples the method further comprises, prior to denoising, performing a signal calibration correction pixel-wise on the time-of-flight image data. Additionally or alternatively, in some examples the remote computing system is remote from a device incorporating the time-of-flight camera. Additionally or alternatively, in some examples the time-of-flight camera further comprises segmenting the coarse depth image data. Additionally or alternatively, in some examples the method further comprises receiving, at a device incorporating the time-of-flight camera, denoised depth image data and denoised active brightness image data from the remote system.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A time-of-flight camera, comprising:
a time-of-flight depth image sensor;
a logic machine;
a communication subsystem; and
a storage machine holding instructions executable by the logic machine to:
process time-of-flight image data acquired by the time-of-flight depth image sensor by, prior to denoising, performing phase unwrapping pixel-wise on the time-of-flight image data to obtain coarse depth image data comprising depth values; and
send the coarse depth image data and the active brightness image data to a remote computing system via the communication subsystem for denoising.

2. The time-of-flight camera of claim 1, wherein the instructions are executable to compress the coarse depth image data and the active brightness image data before sending the coarse depth image data and the active brightness image data to the remote computing system.

3. The time-of-flight camera of claim 1, wherein the instructions are further executable to, prior to denoising, perform a pixel-wise signal calibration correction.

4. The time-of-flight camera of claim 1, further comprising a device incorporating the time-of-flight camera, and wherein the remote computing system is remote from the device incorporating the time-of-flight camera.

5. The time-of-flight camera of claim 1, wherein the instructions are executable to segment a coarse depth image including the coarse depth image data, and send the coarse depth image data to the remote computing system after segmenting.

6. The time-of-flight camera of claim 1, wherein the instructions are further executable to process the time-of-flight image data by, prior to denoising, performing active brightness averaging pixel-wise on the time-of-flight image data to obtain active brightness image data.

7. A computing system comprising:
a logic machine;
a communication subsystem; and
a storage machine holding instructions executable by the logic machine to:

receive coarse depth image data from a remote device comprising a time-of-flight camera,
reconstruct time-of-flight (ToF) phase data from the coarse depth image data,
apply a spatial denoising filter comprising a convolution kernel to the ToF phase data to form denoised depth image data, and
output the denoised depth image data.

8. The computing system of claim 7, wherein the instructions are further executable to receive active brightness image data from the remote device, and denoise the coarse depth image data based at least on the active brightness image data.

9. The computing system of claim 7, wherein the instructions are further executable to segment the coarse depth image data based upon a threshold signal to noise ratio.

10. The computing system of claim 9, wherein the instructions are executable to perform denoising on coarse depth image data with lower signal to noise ratios using a relatively larger convolution kernel, and perform denoising on coarse depth image data with higher signal to noise ratios using a relatively smaller convolution kernel.

11. The computing system of claim 7, wherein the convolution kernel comprises a size in a range of 3×3 to 19×19.

12. The computing system of claim 7, wherein the denoised depth image data is output to the remote device.

13. The computing system of claim 7, wherein the instructions are further executable to denoise the coarse depth image data using temporal filtering based on prior stored coarse depth image data.

14. The computing system of claim 13, wherein the temporal filtering is performed based upon 3-7 previously-received coarse depth images.

15. Enacted on a time-of-flight camera, a method comprising:
receiving time-of-flight image data from a time-of-flight depth image sensor of the time-of-flight camera;
prior to denoising, performing active brightness averaging pixel-wise on the time-of-flight image data to obtain active brightness image data,
prior to denoising, performing phase unwrapping pixel-wise on the time-of-flight image data to obtain coarse depth image data, the coarse depth image data comprising phase errors, and
sending the coarse depth image data and the active brightness image data to a remote computing system via a communication subsystem for correction of at least some of the phase errors.

16. The method of claim 15, further comprising compressing the coarse depth image data and the active brightness image data before sending the coarse depth image data and the active brightness image data to the remote system.

17. The method of claim 15, further comprising, prior to denoising, performing a signal calibration correction pixel-wise on the time-of-flight image data.

18. The method of claim 15, wherein the remote computing system is remote from a device incorporating the time-of-flight camera.

19. The method of claim 15, further comprising segmenting the coarse depth image data.

20. The method of claim 15, further comprising receiving, at a device incorporating the time-of-flight camera, denoised depth image data and denoised active brightness image data from the remote system.

* * * * *